(12) United States Patent
Bluhm et al.

(10) Patent No.: US 8,213,919 B1
(45) Date of Patent: Jul. 3, 2012

(54) CALLER ID HANDLING SYSTEM FOR CALLS PLACED TO A MOBILE PHONE

(75) Inventors: Jay D. Bluhm, Lenexa, KS (US); Manish Mangal, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1249 days.

(21) Appl. No.: 11/687,791

(22) Filed: Mar. 19, 2007

(51) Int. Cl.
*H04M 3/42* (2006.01)

(52) U.S. Cl. ................................ 455/415; 379/142.01

(58) Field of Classification Search .................. 379/224; 455/415
See application file for complete search history.

(56) References Cited

U.S. PATENT DOCUMENTS

| 7,333,820 | B2 * | 2/2008 | Sheha et al. | 455/457 |
| 2003/0016804 | A1 * | 1/2003 | Sheha et al. | 379/201.06 |
| 2003/0194078 | A1 * | 10/2003 | Wood et al. | 379/224 |
| 2006/0166657 | A1 * | 7/2006 | Patel | 455/415 |
| 2006/0222152 | A1 * | 10/2006 | Elias et al. | 379/88.13 |
| 2007/0250884 | A1 * | 10/2007 | Qiu et al. | 725/106 |
| 2008/0125098 | A1 | 5/2008 | Bruce et al. | |
| 2008/0141302 | A1 * | 6/2008 | Ota | 725/34 |

OTHER PUBLICATIONS

Office Action mailed Feb. 18, 2011 in U.S. Appl. No. 11/870,112.
Office Action mailed Feb. 25, 2011 in U.S. Appl. No. 11/870,470.

* cited by examiner

*Primary Examiner* — Nghi H. Ly
*Assistant Examiner* — Joseph Dean, Jr.

(57) ABSTRACT

A system and associated methods deliver Caller ID information directed to a user's mobile phone onto the user's home television set for viewing. One particular method set forth involves selective providing to a video provider information regarding an incoming call destined for and based on the location of a designated mobile phone associated with a particular user, enabling the video provider to insert the information regarding the incoming call into a video stream for delivery to a video display device associated with the particular user. According to the method, a mobile switching center receives a call from a calling phone. Thereafter, a determination is made as to whether designated mobile phone is within a home zone for the particular user. If so, then the calling phone identification and the mobile phone destination number are sent to a video provider associated with the particular user for insertion into the video stream.

17 Claims, 3 Drawing Sheets

CALLER ID HANDLING SYSTEM FOR CALLS PLACED TO A MOBILE PHONE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

For many years, telecommunications systems have embedded information regarding a calling number identification within a digital signal that is transmitted during the initial "ringing signal" portion of a telephone call. This so-called "Caller ID" is displayed on the receiving device (e.g., landline or wireless telephone handset) during the initial ringing of the device prior to answering the call, informing the call recipient of the telephone number associated with the call originator. Companies that provide video content to consumers through their home television set, such as cable and satellite television providers, have also devised a way to display the Caller ID on the subscriber's television set. Through use of a set top box (STB) handing the video content, a double-ended phone cord may be used to interconnect a standard RJ11 type home telephone receiving jack with the STB, so that the ringing signal reaching the home jack is relayed on to the STB for display of the Caller ID on the television connected therewith. This allows the user to see the calling phone number on their television set without having to locate their telephone handset.

Mobile or cellular telephones that are not associated with a particular landline also have the ability to display Caller ID information. However, just as in the case of a landline-based handset or telephone receiver, if the user does not have their mobile phone within reach, they cannot see who is calling them at any given point in time without having to track down the mobile phone. Some mobile phones have the ability to ring in a specific tone or pattern based on the calling number identification received. Many drawbacks exist, however, to utilizing these ring patterns, such as the burden on the mobile phone user in establishing which calling number gets associated with a particular ring pattern (and in remembering how they assigned the ring patterns), the limited number of ring patterns most mobile phones offer, and the fact that the user may not hear their phone ringing if the phone is moved into another area of their house, for instance. Mobile phone user's would benefit from having Caller ID information displayed on their television when the user is actively watching the television and a call is being received on their mobile phone.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The system and methods embodied herein facilitate the delivery of Caller ID information directed to a user's mobile phone onto the user's home television set for viewing. In particular, the Caller ID information is routed to a particular user's video provider for delivery to the user's home television based on whether a "home" condition is currently valid for the particular user. In such a case, current information about the mobile phone location is utilized to determine if there is an increased probability that the user is at home to view the Caller ID information on their home television.

In one aspect, a method is set forth for selectively providing to a video provider information regarding an incoming call destined for and based on the location of a designated mobile phone associated with a particular user, thereby enabling the video provider to insert the information regarding the incoming call into a video stream for delivery to a video display device associated with the particular user. According to the method, a mobile switching center receives a call from a calling phone, which contains information regarding an identification of the calling phone and a destination number associated with a designated mobile phone. Thereafter, a determination is made as to whether designated mobile phone is within a home zone for the particular user. If in fact the designated mobile phone is determined to be within the home zone, then the calling phone identification and the mobile phone destination number are sent to a video provider associated with the particular user. The video provider can then insert the calling phone identification into the video stream being delivered to the particular user's display device (e.g., the user's home television).

Additional advantages and features of the invention will be set forth in part in a description which follows, and in part will become apparent to those skilled in the art upon examination of the following, or may be learned by practice of the invention.

BRIEF DESCRIPTION OF THE SEVERAL VIEWS OF THE DRAWING

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Exemplary Operating Environment

Figure 1:
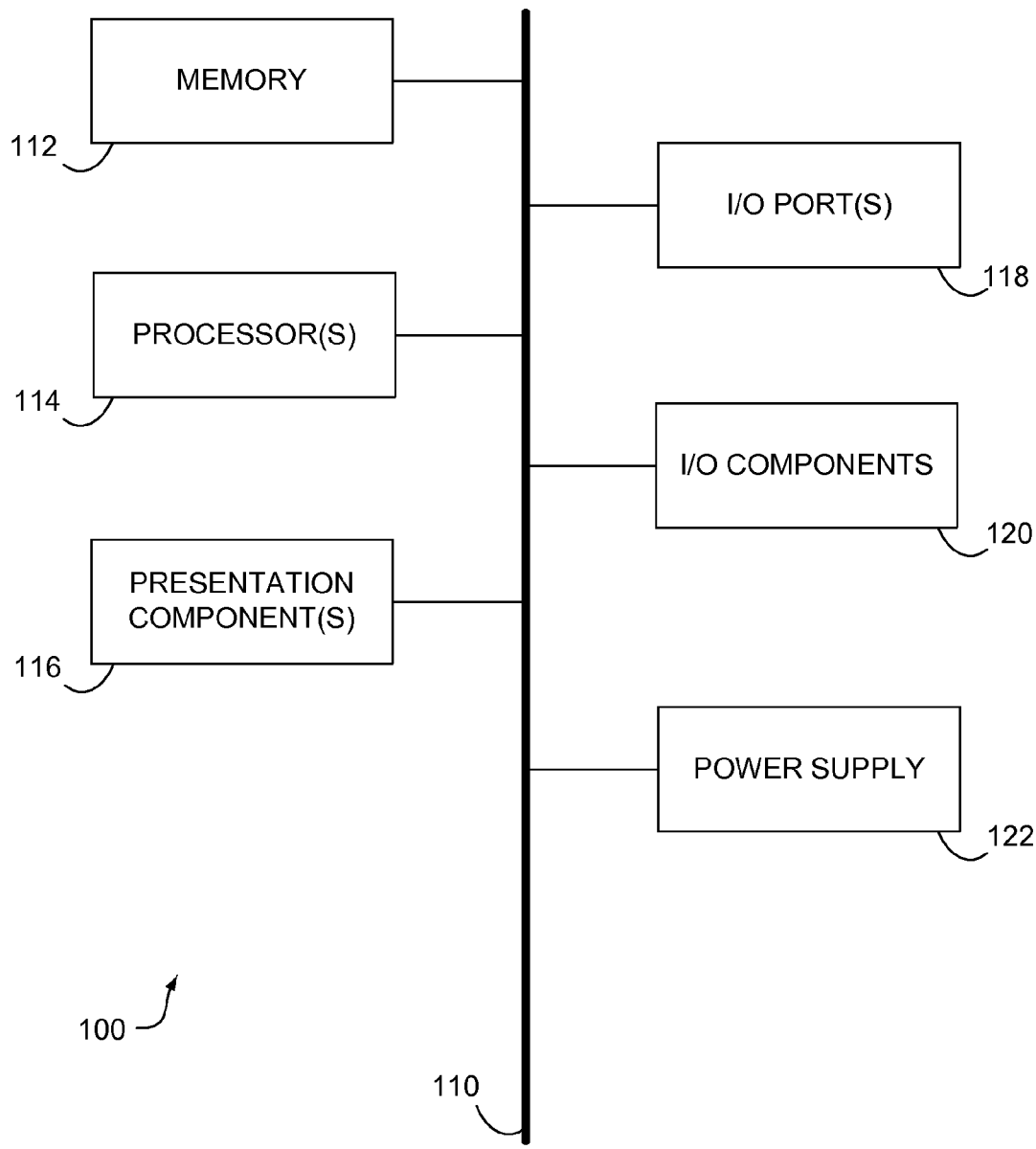
FIG. 1 is a schematic view of an exemplary operating environment suitable for use in implementing the present invention.

Referring initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components illustrated.

The invention may be described in the general context of computer code or machine-useable instructions, including computer-executable instructions such as program modules, being executed by a computer or other machine. Generally, program modules including routines, programs, objects, components, data structures, etc., refer to code that perform particular tasks or implement particular abstract data types. The invention may be practiced in a variety of system configurations, including mobile telephones, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would be more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention.

Computing device 100 typically includes a variety of computer-readable media. By way of example, and not limitation, computer-readable media may comprises Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. In the case of a mobile telephone, for example, the one or more processors 114 may include an application specific integrated circuit (ASIC) where memory 112 is located on the one or more processors 114. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in.

Figure 2:
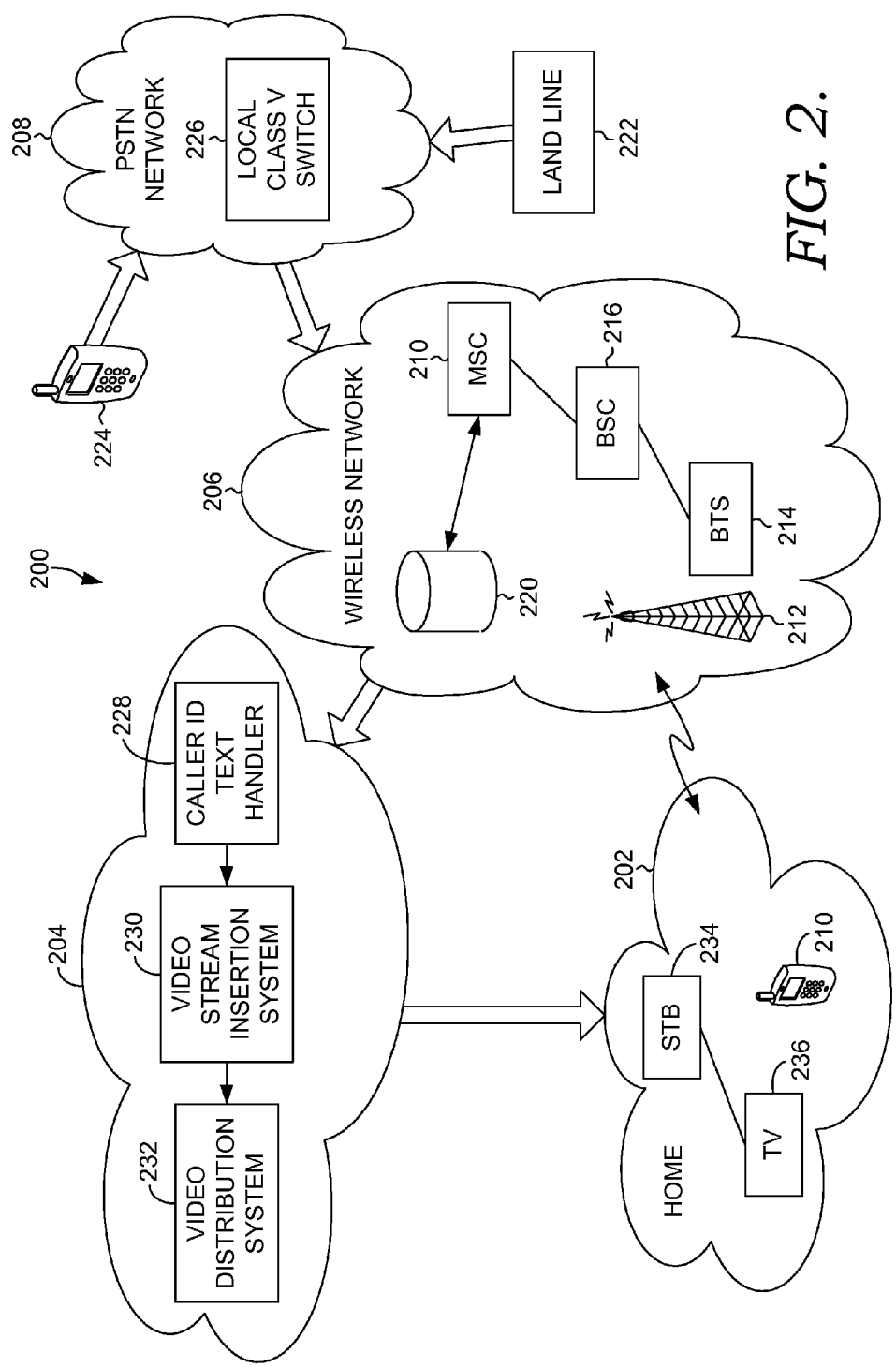
FIG. 2 is a diagrammic view of a system for delivering calling phone identification information destined for a particular user's mobile phone to the user's home television.

Turning now to FIG. 2, a Caller ID handling system 200 is illustrated for directing calling phone identification information destined for a particular user's mobile phone to the user's home television. Different portions of the system 200 handling certain functions specified herein include a home portion 202, a video provider portion 204, a telecommunications wireless network portion 206 and a public switched telephone network (PSTN) portion 208.

A particular user's mobile phone 210 is illustrated as being within or at the user's "home" in FIG. 2, though it should understood that the mobile phone 210 could be in another location, thereby affecting the outcome of certain activities carried out by the present invention, as explained herein. The boundary of the home portion 202, or "home zone", is explained in further detail herein, but essentially encompasses a region recognized by the system 200 as being associated with the user's physical home or some similar limiting spatial factor. As is known in the art, in a wireless network (such as portion 206), mobile phone 210 sends and receives radio signals through a cell tower 212 having a base transceiver system (BTS) 214, a number of which are typically connected to a base station controller (BSC) 216. The BSC 216 manages the communication between a number of BTSs 214 and a limited number of mobile phones compatible with the wireless network. The BSC 216 connects to a mobile switching center (MSC) 218 acting as a telephone exchange to handle the mobile phone activity through the associated one or more BSCs 216 while connecting as needed to the public switched telephone network (such as PSTN portion 208).

Database 220 is utilized by the MSC 218 to determine current "presence" information for mobile phone 210 users. As explained in further detail herein, one way to establish the user's presence as "home" presence is to determine if the user's mobile phone 210 is currently (or very recently) in communication with the user's assigned home MSC, which is the MSC 218 selected to be geographically closest to the user home or other preestablished location when the user established a home location with a particular wireless telecommunications carrier. The so-called "gateway" MSC is the MSC 218 that interfaces with the PSTN portion 208, and also determines the MSC assigned to handle a call to the user's mobile phone 210 based on the current location of the user (whether or not it is in fact the home MSC).

PSTN portion 208 handles both land line calls 222 and wireless calls 224 that have reached the PSTN through a wireless network. For instance, incoming calls to the PSTN portion 208 are handled through a local class V switch 226. Nevertheless, it should be understood that PSTN portion 208 may provide both a circuit-switched network and a packet-switched network, such as for handling some portion of a voice over internet protocol (VoIP) call.

Video provider portion 204 includes a Caller ID text handler 228 for receiving calling phone identification information from the wireless network portion 206 (which may be routed through another network along the way, such as the PSTN portion 208), a video stream insertion system 230 for taking the calling phone identification information and inserting the information as data embedded in a video feed or stream being assembled (e.g., as a data packet or "tag" data), and a video distribution system 232 which transmits the assembled video stream to the designated end user's set top box (STB) 234 connected with their home television 236. It should be understood that video streams often include additional types of media, such as audio content. Further, in the context of the present invention, the term "television" refers to any video display device that may be located at a preestablished destination point that the user has conveyed to the video content provider, referred to as the user's "home". In other words, the home television 236 may encompass a traditional television set, a computer with a monitor connected with the STB 234, or any other similar device. Moreover, the functions of a set top box in receiving video streams and handling the associated content for delivery to the home television 236 (e.g., decompressing/demultiplexing the video stream) may be integrated into the home television 236, such that the STB 234 is not a separate device.

As referred to above, the system 200 works to provide Caller ID information destined for a particular user's mobile phone to the user's home television 236 when it is believed that the user is likely home to view it on the television 206. To do this, the MSC 218 determines the presence condition for the user (more particularly, for the user's designated mobile phone 210). This may be done in a number of ways. As one example, if the database 220 has logged quite recently (e.g., in the past few minutes, or sooner) that the mobile phone 210 is in direct communication with the user's home MSC 218, then it is reasonably likely that the user is within or close to their designated home zone. In other words, if the respective BTSs 214 connected with the home MSC 218 are receiving radio signals from the user's mobile phone 210, then the user is considered to be in the "home zone". As a result, there would be at least a considerable chance that the user would be at home to view any Caller ID information on their home television 236 for calls attempting to reach the user's mobile phone 210. The database 220 would then log a "home" condition. Alternatively, the database 220 (through the MSC 218) could log the GPS coordinates of the mobile phone 210 and periodically compare the coordinates with a preestablished GPS location for the user's home in situations where the mobile phone 210 has a GPS receiver and transmits the determined geolocation to the MSC 218. Upon a match between the coordinates, the database 220 would log the "home" condition. Still further, the wireless network portion 206 could utilize triangulation techniques via a number of BTSs 214 connected with the MSC 218 through the particular BSC 216, to determine a location for the mobile phone 210 (because the location of the cell towers associated with each BTS 214 are known). This would substitute for the GPS coordinates, but otherwise the determination of the "home" condition could be conducted in the same way. It should also be understood that the home MSC 218 for the particular user could store the "home" or "not home" condition in cached memory, to be quickly recalled when the home MSC learns from the gateway MSC that a call is being attempted to user's mobile phone 210 (i.e., for one of the user's associated with the particular MSC.) In any case, the presence condition cached or stored in the database 220 may be determined periodically (e.g., every few seconds, or minutes) in order to save system resources over trying to determine and the presence condition continuously (e.g., every few milliseconds).

Figure 3:
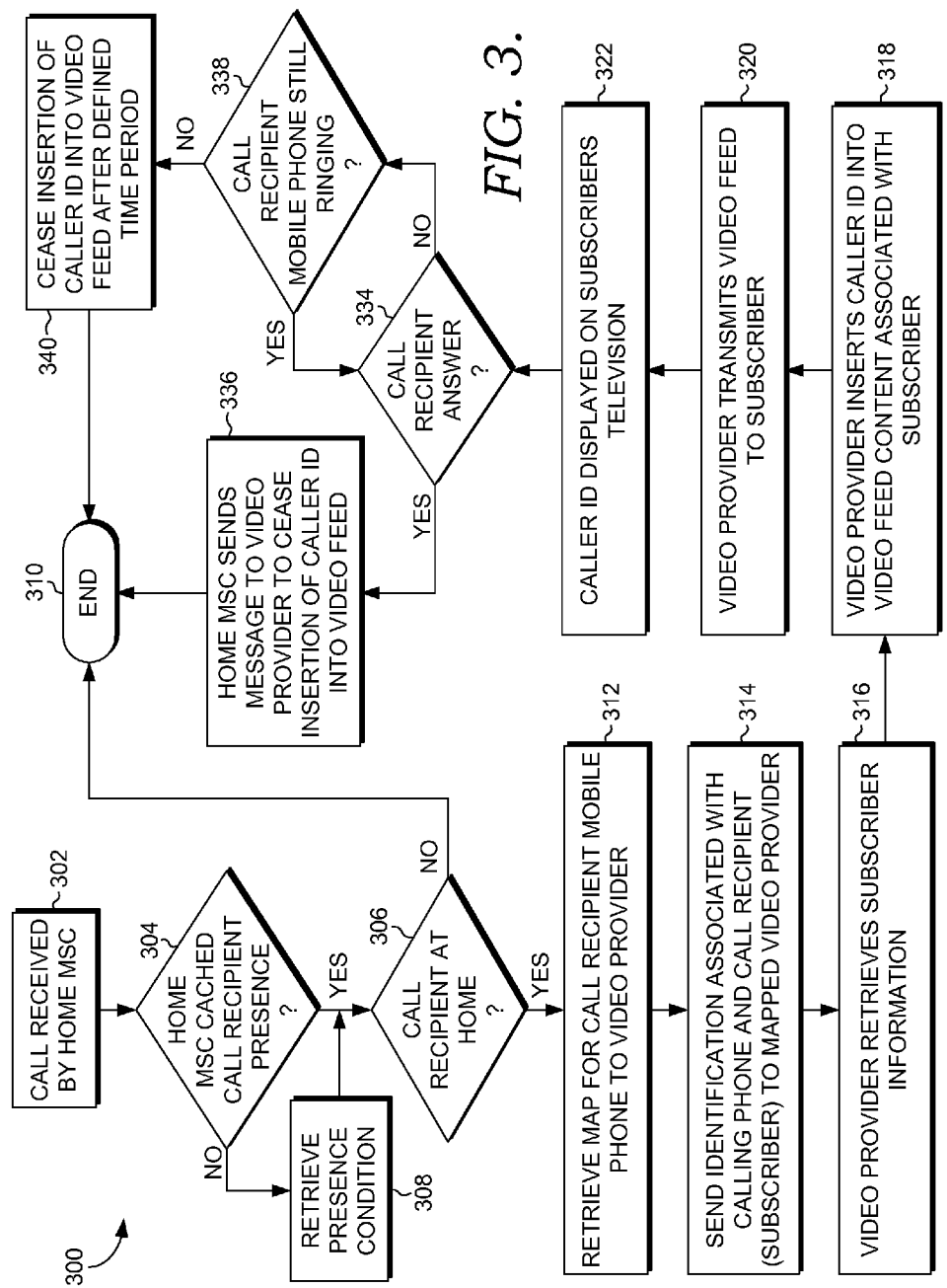
FIG. 3 is a flow diagram representative of a method for delivering calling phone identification information destined for a particular user's mobile phone to the user's home television.

Continuing with FIG. 3, one method 300 of implementing the features of the system 200 to accomplish delivery of calling phone identification information destined for a particular user's mobile phone to the user's home television is depicted. It should be understood that prior to implementing the method 300, the user has designated for the wireless network the identity of the user's video provider, such that the wireless network portion 206 knows to communicate the mobile phone 210 user identity and the calling phone identification information (Caller ID) to a particular video content provider chosen by the user.

At a first step 302 of the method 300, a call is received by the home MSC 218 for the particular mobile phone 210 user. As shown in FIG. 2, the call comes across the PSTN portion 208 from a land line phone or a wireless or mobile phone (or a computer modem acting as a phone for a VoIP call, etc.). The call first reaches the gateway MSC, which contacts the home MSC 218.

A determination is then made in step 304 as to whether the home MSC 218 has cached the call recipient's (i.e., the mobile phone 210 user's) presence condition. If so, then in step 306 the MSC 218 inquires as to whether the call recipient has been recently designated as being home or within the "home zone". Otherwise, if the home MSC 218 has not cached the call recipient's, then in step 308, the MSC 218 retrieves the presence condition from the database 220, and the method continues at step 306.

Returning to step 306, if the call recipient is not at home (i.e., the "not home" condition is currently valid), then there is no need to send the Caller ID information to the user's home television, and thus the method 300 concludes at step 310. Alternatively, if the call recipient is at home (i.e., the "home" condition is currently valid), then in step 312 the "map" or relational chart providing the link between the user's mobile phone number and the video provider associated with that particular user (the user as a subscriber of the video provider's content) is retrieved. This is possible because the incoming call contained the destination number the caller is trying to reach, which is the user's mobile phone number.

Having the mobile phone number to video content provider map, then in step 314, the calling phone identification information and the user's mobile phone number are sent to the particular video provider (i.e., video provider portion 204). As can be understood, because the video provider has already been furnished with the user's mobile phone number sometime in the past (through authorization of the wireless network to furnish information associated with handled calls to the video provider), the video provider can easily look up the identity of the particular user to receive video content based on the mobile phone number of the same user. Accordingly, in step 316, the video provider portion 204 retrieves the subscriber information, and then in step 318, inserts the calling phone identification information (or Caller ID) into the video feed content associated with the subscriber/user. In step 320, the video provider transmits or "streams" the video feed to the user at the home portion 202. Finally, in step 322, the Caller ID information is displayed on the mobile phone 210 user's home television 236.

Upon displaying the caller ID information on the user's home television 236, it is determined whether the user, as the call recipient, has answered the call on their mobile phone 210 in step 334. Based on the activity surrounding the setup and actual connection of a voice channel for a call, the home MSC 218 is made aware of whether the call has been answered. If the call has in fact been answered, then in step 336, home MSC 218 sends a command message to the video provider portion 204 to cease insertion of the Caller ID into the video feed for distribution. Thereafter, the method 300 moves to conclusion at step 310. On the other hand, if the call has not been answered, then it is further determined in step 338 whether the call recipient's mobile phone 210 continues to ring. If the mobile phone 210 continues to ring, then the method 300 returns to step 334 where a determination is made again as to whether the mobile phone 210 user has answered the call. If the call recipient's mobile phone 210 is no longer ringing and a call cannot be completed, then the home MSC 218 informs the video provider portion 204 of this condition in step 340, enabling the video stream insertion system 230 to cease insertion of the Caller ID information into the video feed within a defined period of time (e.g., immediately, after 2 additional seconds, etc.). From step 340, the method 300 moves to conclusion at step 310.

As an alternative, steps 334-340 may be omitted from the method 300 if there is no concern about whether the Caller ID information should be displayed based on the user actually answering their mobile phone 210. It may be desirable, for instance, to merely have display of the Caller ID information (from step 322) for a predetermined amount of time regardless of whether the user actually answer's their mobile phone 210, since the information displayed on the home television 236 typically would only last for a few seconds, and thus would not be very distracting when viewing media content on the television receiving the video feed.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A method for selectively providing information regarding an incoming call destined for a designated mobile phone associated with a particular user based on the location of the designated mobile phone for delivery to a video display device associated with the particular user, comprising:
    periodically determining whether the designated mobile phone is within a home zone for the particular user, wherein the determining is performed at a network element within a mobile communications network that provides carrier service to the designated mobile phone;
    based on the determining, storing in a database associated with the network element a presence indication that indicates whether the designated mobile phone is within the home zone for the particular user;
    receiving, by a mobile switching center, a call from a calling phone, the call containing information regarding an identification of the calling phone and a destination number associated with the designated mobile phone;
    retrieving the presence indication;
    when the presence indication indicates that the designated mobile phone is within the home zone for the particular user, then sending the calling phone identification and the mobile phone destination number to a video provider associated with the particular user.

2. The method of claim 1, wherein the home zone for the particular user is defined as a spatial area within a certain distance of one of:
    the mobile switching center serving as a home center for the designated mobile phone; or
    a second mobile switching center serving as a home center for the designated mobile phone, the second mobile switching center being in communication with the mobile switching center receiving the call from the calling phone.

3. The method of claim 2, wherein determining if the designated mobile phone is within a home zone involves locating the designated mobile phone by one of GPS location techniques or triangulation.

4. The method of claim 2, wherein determining if the designated mobile phone is within a home zone involves communication activities between the designated mobile phone and the home center.

5. The method of claim 1, wherein determining if the designated mobile phone is within a home zone involves retrieving a presence condition for the designated mobile phone from a database accessible to the mobile switching center.

6. The method of claim 1, further comprising:
    registering, by the mobile switching center, the occurrence of the designated mobile phone ceasing to ring for the call from the calling phone; and
    generating and transmitting a signal to the video provider to cease insertion of the information regarding the incoming call into a video stream being delivered to the video display device.

7. A method for selectively providing to a user-associated video provider information regarding an incoming call destined for and based on the location of a user-associated mobile phone ("mobile phone"), comprising:
    receiving by a mobile switching center information associated with a call placed from a calling phone to the mobile phone, the received information including an identification of the calling phone and a destination number assigned to the mobile phone, and the mobile phone being registered to a first user;
    determining if the mobile phone is within a corresponding home zone for the first user based at least in part on whether the mobile phone recently communicated with the mobile phone's assigned home MSC;
    when it is determined that the mobile phone is within the corresponding home zone for the first user, then sending the identification information for the calling phone and the destination number of the mobile phone to the user-associated video provider for insertion of the calling phone identification information into a video stream for delivery to a video display device registered to the first user;
    determining whether the call to the user-associated mobile phone has been answered;
    when it is determined that the call has been answered, then sending a signal to the user-associated video provider to cease insertion of the calling phone identification information into the video stream;
    when it is determined that the call has not been answered, then determining whether the call can be completed; and
    when it is determined that the call cannot be completed, then sending the signal to the user-associated video provider to cease insertion of the calling phone identification information into the video stream.

8. The method of claim 7, wherein the home zone for the first user is defined as a spatial area within a certain distance of one of:
    the mobile switching center serving as a home center for the mobile phone; or
    a second mobile switching center serving as a home center for the mobile phone, the second mobile switching center being in communication with the mobile switching center receiving the information associated with the call placed from the calling phone.

9. The method of claim 8, wherein determining if the mobile phone is within a home zone involves locating the mobile phone by one of GPS location techniques or triangulation.

10. The method of claim 8, wherein determining if the mobile phone is within a home zone involves communication activities between the mobile phone and the home center.

11. The method of claim 7, wherein determining if the mobile phone is within a home zone involves retrieving a presence condition for the mobile phone from a database accessible to the mobile switching center.

12. Nontransitory computer-readable media having embodied thereon computer-usable instructions for performing a method for selectively providing to a video provider that is associated with a particular user information regarding an incoming call destined for a designated mobile phone associated with the particular user based on the location of the designated mobile phone for delivery to a video display device associated with the particular user, the method comprising:

receiving, at a mobile communications network that provides carrier service to the designated mobile phone, an authorization from the particular user to furnish the video provider with information associated with calls destined for the designated mobile phone, wherein the authorization includes a designation of the video provider;

periodically determining whether the designated mobile phone is within a home zone for the particular user, wherein the determining is performed at a mobile switching center (MSC) within the mobile communications network;

based on the determining, storing a presence indication that indicates whether the designated mobile phone is within the home zone for the particular user;

receiving, at the mobile switching center, a call from a calling phone, the call containing information regarding an identification of the calling phone and a destination number associated with the designated mobile phone;

retrieving the presence indication;

when the presence indication indicates that the designated mobile phone is within the home zone for the particular user, then identifying the video provider based on the designation received from the user; and sending the calling phone identification and the mobile phone destination number from the mobile communications network to the video provider.

13. The media of claim 12, wherein the home zone for the particular user is defined as a spatial area within a certain distance of one of:

the mobile switching center serving as a home center for the designated mobile phone; or a second mobile switching center serving as a home center for the designated mobile phone, the second mobile switching center being in communication with the mobile switching center receiving the call from the calling phone.

14. The method of claim 13, wherein determining if the designated mobile phone is within a home zone involves locating the designated mobile phone by one of GPS location techniques or triangulation.

15. The media of claim 13, wherein determining if the designated mobile phone is within a home zone involves communication activities between the designated mobile phone and the home center.

16. The media of claim 12, wherein determining if the designated mobile phone is within a home zone involves retrieving a presence condition for the designated mobile phone from a database accessible to the mobile switching center.

17. The media of claim 12, further comprising:

registering, by the mobile switching center, the occurrence of the designated mobile phone ceasing to ring for the call from the calling phone; and generating and transmitting a signal to the video provider enabling the video provider to cease insertion of the information regarding the incoming call into a video stream being delivered to the video display device.

* * * * *